United States Patent [19]

Little

[11] Patent Number: 5,088,861

[45] Date of Patent: Feb. 18, 1992

[54] THREADMILLING TOOL

[75] Inventor: Roger W. Little, Santa Fe, Tex.

[73] Assignee: Threading Systems, Inc., Houston, Tex.

[21] Appl. No.: 675,571

[22] Filed: Mar. 25, 1991

Related U.S. Application Data

[63] Continuation-in-part of Ser. No. 468,564, Jan. 23, 1990, Pat. No. 5,004,379.

[51] Int. Cl.5 .................. B23G 5/18; B23C 5/28
[52] U.S. Cl. ........................ 407/11; 407/48; 407/104; 408/222; 408/233
[58] Field of Search ............ 407/11, 103, 113, 114, 407/34, 48, 104; 408/215, 222, 233; 10/101 R, 102, 141 R

[56] References Cited

U.S. PATENT DOCUMENTS

| 1,701,775 | 2/1929 | Hall | 408/215 |
| 2,954,570 | 10/1960 | Couch | 407/11 X |
| 4,531,863 | 7/1985 | Smith | 408/215 X |
| 4,607,988 | 8/1986 | Salm et al. | 407/104 X |
| 5,004,379 | 4/1991 | Little | 407/113 |

Primary Examiner—Steven C. Bishop
Attorney, Agent, or Firm—Arthur Freilich; Robert D. Hornbaker; Leon D. Rosen

[57] ABSTRACT

A threadmilling tool is described, of the type that includes a thread cutting insert 14 (FIG. 1) that mounts on an insert holder 12 which is turned by a milling machine, wherein the insert provides four separate cutting edges 30-36 and can be accurately relocated on the holder. The insert has a cross-section forming a mount portion 50 (FIG. 5) with six straight locating sides 51-56 lying on the sides of an imaginary bisymmetrical polygon 58, and forming a radially outwardly-extending arm 60, 62 at each corner of the polygon. Each arm has an outer border 70 and a pair of opposite sides 72, 74 that extend largely radially from the axis 24 of the polygon, and each arm forms a cutting edge (e.g. 30) at the intersection of the outer border and each side of the arm. A tool holder 16 (FIG. 2) for holding the insert, has walls forming, in cross-section, a pair of straight holder positioning surfaces 80, 82 that abut a pair of insert locating sides, while avoiding contact with the arms 60, 62.

11 Claims, 3 Drawing Sheets

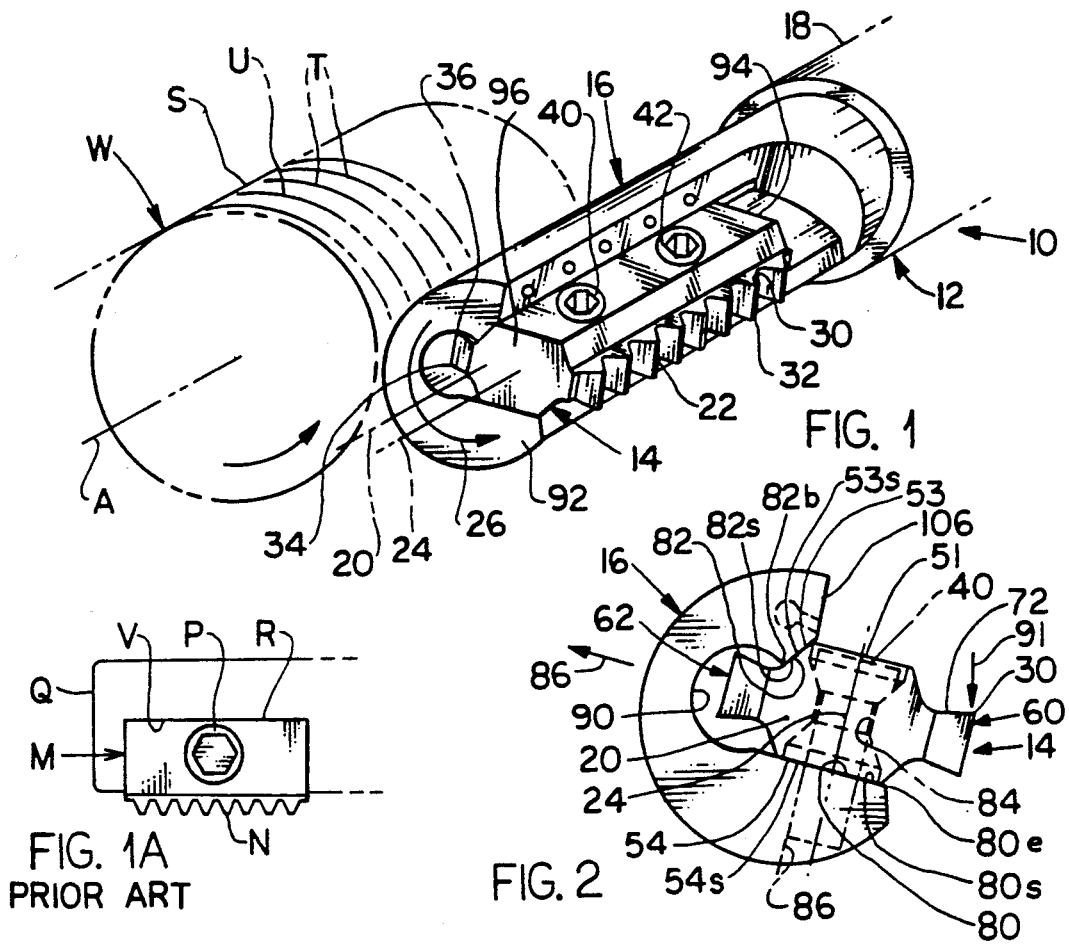
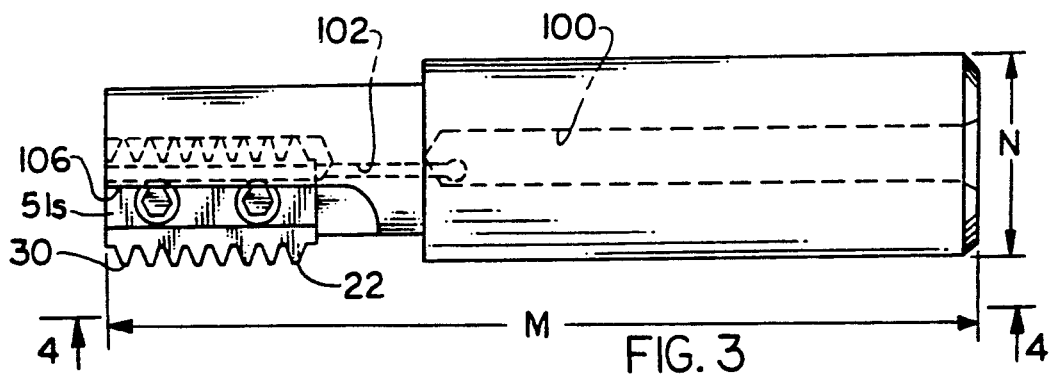
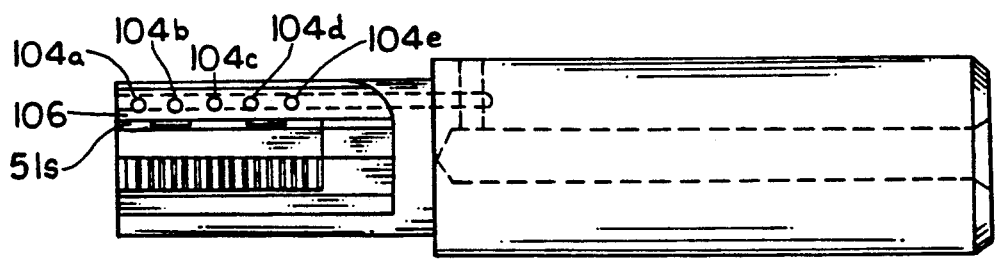

THREADMILLING TOOL

BACKGROUND OF THE INVENTION

One type of thread milling cutter has a holder with a shank that is rotated by a milling machine, and that holds an insert with several projecting teeth for cutting threads in a workpiece. As the holder is rotated in a milling machine, it is pressed against a cylindrical region of a workpiece to be threaded, with the workpiece being slowly turned and shifted axially so after one turn of the workpiece a continuous thread with many turns has been cut therein. One type of thread milling insert (FIG. 1A) is in the form of a largely rectangular flat plate with thread cutting teeth formed along one edge and with the opposite edge being straight. A flat surface of the insert is placed against a flat positioning surface on the holder and a two-directional clamping screw is installed to press the smooth edge of the insert against a secondary locating surface on the holder. The Snap-Tap brand thread milling insert is of this construction. The Vardex thread milling cutter sold by V.N.E. Corporation has smooth edges forming a V to accurately locate the insert in two directions.

The above-described prior art thread milling inserts have two cutting edges, one at the top edge of the cutting teeth and the other at the bottom edge of the cutting teeth. When one edge becomes worn after considerable use, the insert is removed, flipped over, and reinstalled to provide a second cutting edge. It might be thought that the locating edge could be formed with teeth so as to provide four cutting edges, but the repeated pounding to which the insert is subjected would result in damage to such teeth along the locating edge and/or to the positioning surface of the tool holder. Such damage must be avoided, to assure that each time an insert is installed its cutting edges lies within a small tolerance such as 0.0005 inch of the preceding one to minimize down time on CNC equipment. A threading tool with an insert having four separately useable cutting edges, which could be quickly relocated each time with its thread cutting edge located with high precision, would be of considerable value.

SUMMARY OF THE INVENTION

In accordance with one embodiment of the present invention, a threading apparatus, especially useful for milling of threads, is provided which includes a replaceable insert having multiple thread cutting edges for long life, and yet which assures long life for the tool holder and high precision repeated mounting of the insert. The insert has a cross-section forming a mount portion with a plurality of straight insert locating sides lying on the sides of an imaginary polygon that has an axis. The cross section includes an arm extending radially outwardly at each of a plurality of corners of the polygon. Each arm has an outer border and opposite sides, and forms a cutting edge at the intersection of each arm side with the outer border. The outer border has at least one thread-cutting tooth forming a pair of cutting edges. A tool holder for holding the insert has walls forming, in cross section, a pair of straight holder positioning sides that abut a pair of the insert locating sides. Thus, the insert is located at a pair of its locating sides that are free of teeth to avoid damage to the insert holder, while assuring accurate relocating of the insert.

In one threading tool, the insert cross section forms substantially a hexagon with two opposite sides (51, 54 in FIG. 5) longer than the other four sides (52, 53, 55, 56). The two longer sides constitute a pair of straight parallel primary locating sides while the four shorter sides constitute pairs of secondary locating sides extending at obtuse angles from each end of each primary locating side. The insert has two arms (60, 62) that each extend from the intersection of imaginary extensions of the secondary locating sides. An insert holder has a cross section with a main positioning side (80, FIG. 2) abutting a first primary locating side of the insert, and having a secondary positioning side (82) abutting one of the insert secondary locating sides. The holder has a cutout (90) for receiving an arm that is not being used, and which avoids contact with the outer border and each side of that arm.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of a threading apparatus of the present invention, which includes a threading insert mounted on an insert holder, and indicating how it can be used to mill a thread in a workpiece.

FIG. 1A is a plan view of a prior art threading apparatus.

FIG. 2 is an end view of the threading apparatus of FIG. 1.

FIG. 3 is a plan view of the threading apparatus of FIG. 2.

FIG. 4 is a side elevation view of the threading apparatus, as taken on line 4—4 of FIG. 3.

DESCRIPTION OF THE PREFERRED EMBODIMENTS

Figure 5:
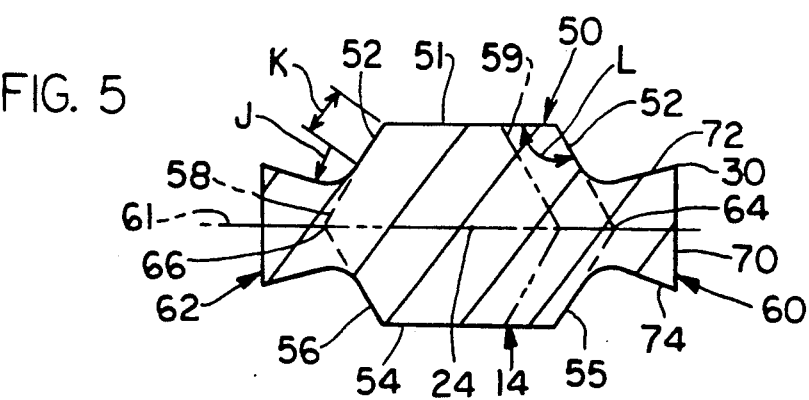
FIG. 5 is a sectional view of the threading insert of FIG. 2, and which is taken on the line 5—5 of FIG. 6.

FIG. 1 illustrates a threading apparatus 10 which includes an insert holder 12 and a threading insert 14 mounted on a free end portion 16 of the holder. The holder has a rear end portion 18 in the form of a shank that can be captured in a collet of a milling machine spindle, Which rotates the holder about a holder axis of rotation 20. The 4 has thread cutting teeth 22 spaced apart parallel to the axis 24 of the insert. As the insert holder 12 and the insert 14 thereon rotate in the direction 26 about the axis of rotation 20, the thread cutting teeth 22 cut multiple grooves in the cylindrical surface S of a workpiece W. When used in a CNC machine, the rapidly rotating holder and insert slowly move in a circle about the axis A of the workpiece, while the workpiece is gradually moved along the axis A, to cut multiple turns T of a continuous helical thread U in the workpiece.

After the threading apparatus has been used for awhile, the cutting edge 30 of the threading insert will become dull. The insert can be "flipped over" so a second cutting edge 32 which is sharp, can be used to cut threads. When the second cutting edge is worn, the insert can be removed and turned "end-for-end" to position a third cutting edge 34 in position to cut threads. Finally, the insert can be "flipped over" again to position a fourth cutting edge 36 to cut threads. The insert holder includes a pair of clamping screws 40, 42 that serve as a clamp to hold down the insert, with the screws being readily removed and reinstalled. It is important that, after each installation, the position of the new cutting edge be at precisely the same position as the previous cutting edge. Such precision, which commonly must be maintained to within 0.0005 inch, enables precision thread cutting on a CNC milling machine, without having to reposition the milling machine spindle with respect to a workpiece holder after each removal and replacement of the insert.

One type of prior art threading apparatus is of the type shown in FIG. IA, which includes an insert M in the shape of a simple plate, except that it has an arm with cutting edges forming thread cutting teeth N. The insert was mounted by a clamping screw P to a holder Q. When an upper cutting edge along the teeth N was worn, the insert was "flipped over" and reinstalled, with the clamping screw P pressing a flat lower surface of the insert against a corresponding surface of the holder, and also pressing a locating edge R of the insert against a corresponding positioning edge V of the holder. It might be thought that additional cutting edges could be obtained by forming teeth along the rear locating edge R of the insert. However, such teeth could dig into the holder positioning surface V and damage it sufficiently that inserts could not be mounted with the desired degree of precision such as within 0.0005 inch. While two cutting edges provides a longer lifetime than one, the ability to provide more than two cutting edges would be even more desirable.

As shown in applicant's FIG. 5, the insert 14 has a cross section forming a mount portion 50 with six locating sides 51-56. The sides 51-55 lie on the sides of an imaginary polygon having the axis 24, with the polygon having the shape indicated at 58 if a pair of secondary sides such as 53, 56 were extended. The polygon is similar to a hexagon indicated at 59, except that two sides 51 and 54 are longer than the other four sides. As a result, the polygon is bisymmetrical, that is, symmetrical about any imaginary line such as line 61 that passes through the insert axis 24. The two longer sides 51, 54 of the polygon are primary locating sides, while the other four sides 52, 53, 55, and 56 are secondary locating sides. The insert also has a pair of arms 60, 62 extending substantially radially (with respect to insert axis 24) outwardly at each of two corners 64, 66 of the polygon. Each arm has an outer side or border 70 lying farthest from the insert axis 24, and has a pair of arm sides 72, 74. The intersection such as 30 where each outer border intersects an arm side such as 72, forms one of the four cutting edges 30-36 of the insert.

As shown in FIG. 2, the insert can be mounted on the insert holding end portion 16 of the holder with a particular cutting edge 30 in position to cut a thread. The insert is placed with the second primary locating side 54 of the insert against a straight primary positioning side 80 of the holder. The insert is pressed in the direction 86 until the first secondary locating side 53 of the insert abuts a straight secondary positioning side 82 of the holder. These two positioning sides 80, 82 of the holder accurately locate the insert axis 24 with respect to the holder axis 20 and precisely fix the orientation of the insert with respect to the holder. The clamping screws 40, 42, which project through holes 84 in the insert and thread into threaded holes 86 of the holder, hold the insert down against the holder main positioning side 80 and firmly press the insert in the direction 86 against the holder secondary positioning side 82, such clamping screws being known in the prior art. It is noted that a different one of the four secondary locating sides is used in each of the four possible positions of the insert on the holder, while each primary locating side is used in two of the positions.

With the insert installed as shown in FIG. 2, the holder can be rapidly rotated about its axis 20, to cause the cutting edge 30 of the insert to move about the axis 20 and cut a thread.

The holder has an elongated slot 90 which receives the second arm 62 of the insert when the first arm 60 is being used to cut a thread. The walls of the slot 90 are large enough to avoid contact with any portion of the arm 62. The only contact between the insert and holder is at the two positioning sides 80, 82 of the holder. By providing a slot 90 to avoid contact with the arm 62 and any of its teeth, applicant avoids damage to any locating surface of the holder, which could be damaged if it bore against the arm 62 as a thread was cut and the threading apparatus was subjected to repeated pounding during such cutting. Instead, only flat surfaces 54s, 53s of the insert contact corresponding flat positioning surfaces 80s, 82s of the holder, to provide wide area contact between them that avoids damage to the surfaces from pounding occurring during thread cutting. It is noted that during thread cutting, with the apparatus in the orientation shown in FIG. 2, the force 91 on the insert is against the cutting edge 30, which is translated primarily to a downward force against the main positioning surface 80s. The main positioning surface 80s is within 20° of parallelism with the direction of the downward force against the cutting edge 30, to withstand such force. The insert is constructed with the length of the main positioning side 80 being more than 50% greater than the length of the straight portion of the secondary locating side 53 of the insert, with such a long main positioning side 80 being able to distribute the force encountered in threading, over a wide area.

The slot 90 which receives the insert arm 62, extends to the extreme free end 92 of the holder. The bottom 82b of the secondary positioning side 82 prevents the insert from being merely laid on the main positioning side 80 and being slid into position. Instead, the slot encourages installation of the insert by placing one of the ends 94, 96 (FIG. 1) of the insert into the slot and sliding the insert along the holder axis 20 into position. By thus installing the insert from one end of the holder and sliding it into position, dust and dirt accumulating on the positioning surfaces 80s, 82s of the holder tend to be scraped away. Considerable dust can be present in a machining environment, especially when machining iron or steel with a scale on it. If fine dust particles were to lie between an insert locating surface and a holder positioning surface, such particles could interfere with precision locating of the surface and/or damage the precision positioning surfaces of the holder. It is noted that the insert is of harder material than the holder so damage is more likely to be done to the holder. As discussed above, since a precision such as within 0.0005 inch is commonly required, the presence of fine dust can significantly interfere with the required level of precision. The construction which encourages sliding of the insert along the holder positioning surfaces during installation of the insert, minimizes one important source of possible imprecision and damage.

As shown in FIGS. 3 and 4, applicant prefers to provide a coolant passage 100 in the holder, that can carry coolant to the insert to cool the cutting edge 30 that is currently being used. The passage includes an outer passage portion 102 and a plurality of holes 104a–104d leading from the outer passage portion to a holder surface 106 that lies above the first primary positioning surface 51s which does not abut a holder surface. The holes 104 include four separate holes 104a–104e positioned to direct coolant along the insert surface 51s and then on to the upper side 72 of the thread cutting teeth of the arm 60. The insert is elongated to cut multiple threads, with the particular insert shown in FIG. 3 having eight teeth 22 to cut eight threads, and the plurality of holes distributes the coolant to flow over all of the teeth to cool them. It may be noted that the threading apparatus rapidly rotates, more commonly about a horizontal axis, but most of the coolant still flows along the insert and its cutting teeth.

Figure 5A:
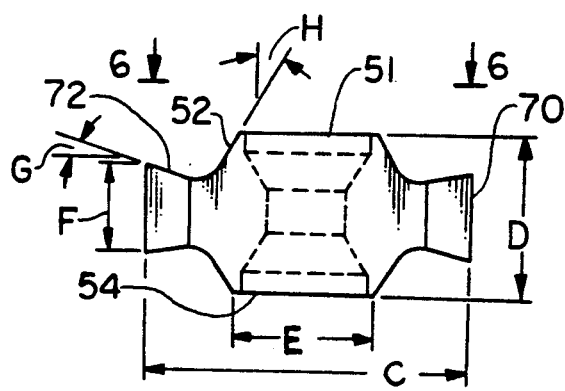
FIG. 5A is an end view of the threading insert of FIG. 5.
Figure 6:
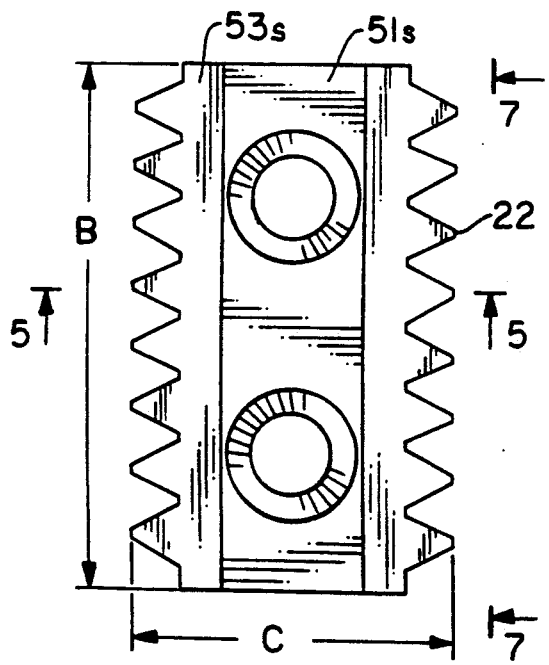
FIG. 6 is a plan view of the insert of FIG. 5A, and is a view taken on the line 6—6 thereof.
Figure 7:
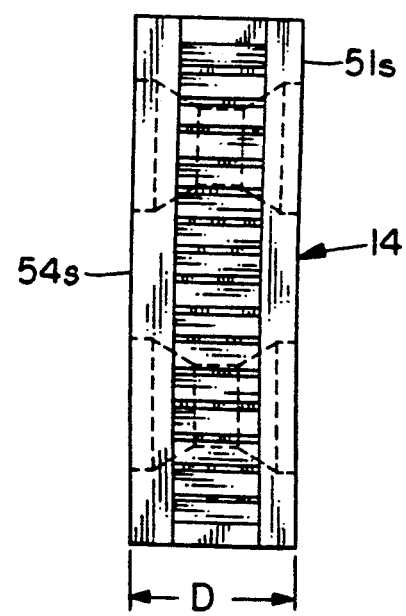
FIG. 7 is a side elevation view of the threading insert, and is a view taken on the line 7—7 of FIG. 6.

Applicant has constructed an insert of the type shown in FIGS. 1–7, with a length B of 1.063 inches, a width C of 0.630 inch, and a thickness D of 0.310 inch. As shown in FIG. 5A, each main locating surface 51, 54 had a width E of 0.270 inch. Each arm had an outer border 70 of a width F of 0.170 inch. Each arm side 72 extended at an angle G of 14 from the horizontal (a direction parallel to each primary locating side), while each secondary primary side 52 extended at an angle H of 30° from the vertical. A radius J (FIG. 5) of about 0.088 inch was present at the intersection of each arm side 72 and secondary locating side 52. This resulted in each secondary locating side having a length K along which it was straight, of about 0.074 inch. It may be noted that one reason why applicant angles the secondary locating surface 52 at an angle H of about 30° (between 15 and 45°), instead of having the surface 52 extend vertically, is that this results in the outer edge of the holder main positioning surface of 80e (FIG. 2) having a substantial thickness. It would be undesirable in the particular design shown) to have the secondary positioning surface extend vertically so the insert part closest to the cutting edge would be unsupported. Such angling results in each secondary side extending at an obtuse angle L from a primary locating side. The insert holder had a length M (FIG. 3) of 5 inches and a diameter N of 1 inch.

Figure 8:
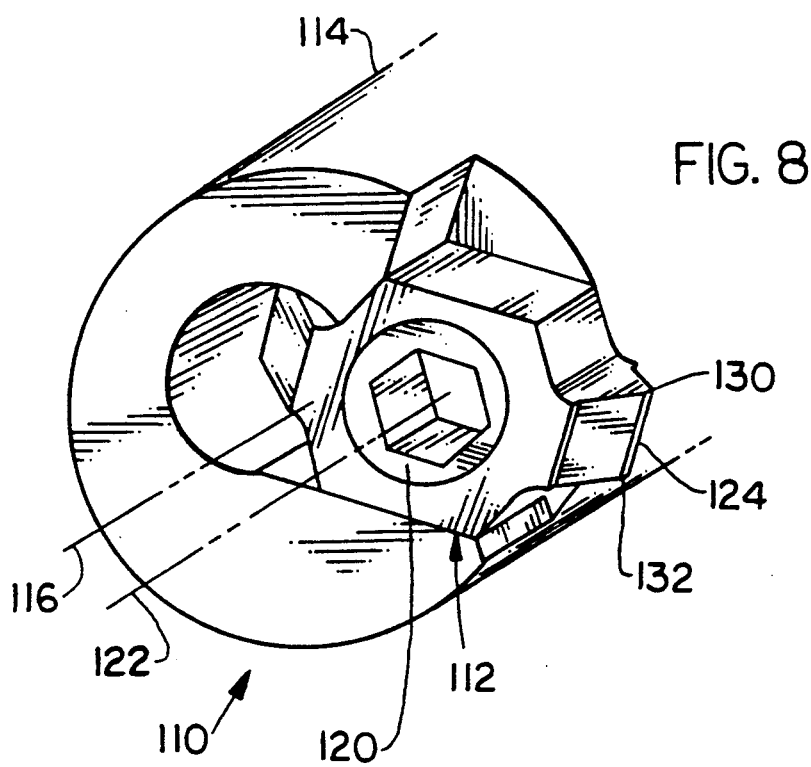
FIG. 8 is a partial isometric view of a threading apparatus for internal threading and in accordance with another embodiment of the invention.
Figure 9:
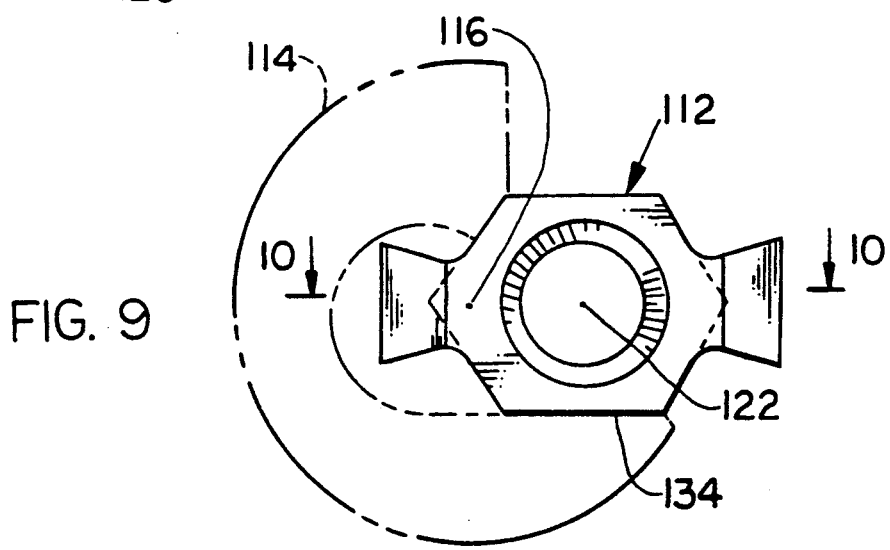
FIG. 9 is an end view of the insert of the threading apparatus of FIG. 8.
Figure 10:
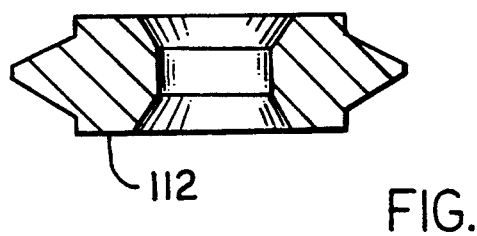
FIG. 10 is a sectional view taken on the line 10 of FIG. 9.

FIGS. 8–10 illustrate a threading apparatus 110 which is designed for internal threading in small holes. The apparatus includes a threading insert 112 which is attached to a holder 114 that rotates about a holder axis 116. The attachment is made by a clamping screw 120 that extends parallel to the axis 122 of the insert instead of perpendicular to it. The insert 112 has only one tooth 124 to cut only one thread at a time, with each tooth having two cutting edges 130, 132, and with there being two teeth to provide for cutting edges in the same manner as for the threading insert of FIGS. 1–7. The insert has a cross-section similar to that of FIG. 5, except that each primary positioning side such as 134 is shorter to enable mounting on a holder 114 of smaller diameter.

Thus, the invention provides a threading apparatus, which can be used as a stationary threading bar but which is especially useful as a thread milling apparatus, which includes a threading insert that is detachably mountable on a holder. The insert has a cross section forming a mount portion with a plurality of straight locating sides lying on the sides of an imaginary bisymmetrical polygon, with the insert having arms extending radially from at least two corners of the polygon. Each arm has an outer side or border and a pair of opposite sides that extend largely radially outward from the polygon. The intersection of the cutting border with each side forms a cutting edge which can cut a thread. A preferred insert design has a mount portion in largely the shape of a hexagon, but with two opposite sides longer than the rest and forming a pair of opposite parallel primary locating sides. The other four sides form secondary locating sides extending at about 30° (15° to 45°) from a primary locating side. The insert also has. a pair of arms that each extends radially from the insert axis, from an intersection of imaginary extensions of a pair of secondary locating sides. This construction results in an insert of small size that can be mounted on a rotatable thread milling tool holder or stationary threading bar of small diameter. By providing a slot in the holder that surrounds an arm without contacting it, and pressing a pair of mount sides against corresponding positioning sides of the holder, applicant can provide arms with thread cutting teeth at its opposite sides, without having to locate on such teeth.

Although particular embodiments of the invention have been described and illustrated herein, it is recognized that modifications and variations may readily occur to those skilled in the art, and consequently it is intended that the claims be interpreted to cover such modifications and equivalents.

I claim:
1. A threading apparatus, comprising;
   a thread cutting insert having a cross-section with an axis, said cross-section being bisymmetrical about said axis;
   said cross-section including a pair of straight parallel primary locating sides on opposite sides of said axis with each primary locating side having first and second opposite ends, a first pair of secondary locating sides extending at an obtuse angle from the first end of each primary locating side, and a second pair of secondary locating sides extending at an obtuse angle from the second end of each primary locating side;
   said cross-section including a radially outwardly extending arm extending from the intersection of imaginary extensions of each of said pairs of secondary locating sides, with each arm having an outer border and a pair of opposite arm sides that extend largely radially, and with each arm forming a cutting edge at the intersection of the outer border and each side of the arm.

2. The threading apparatus described in claim 1 wherein:
   said insert is a thread milling insert that is elongated parallel to said axis, and each of said cutting edges has thread cutting teeth spaced along a direction parallel to said axis to enable cutting a plurality of thread turns at the same time.

3. The threading apparatus described in claim 2 including:
an elongated insert holder including an insert receiving portion having a cross section with a straight holder positioning side for face wise abutting a first of said primary locating sides of said insert and with a holder secondary positioning side for facewise abutting one of said secondary locating sides of said insert that extends from the second of said primary locating sides of the insert;
clamping means for securely pressing one of said insert primary locating sides and one of said insert secondary locating sides respectively against said holder primary and secondary positioning sides.

4. The threading apparatus described in claim 3 wherein:
said insert holder has a coolant passage extending largely along its length and a plurality of holes connecting to said passage and having outer ends opening to an insert mounted in said insert holder;
the outer ends of each of said plurality of holes opening to the primary locating side which lies opposite said primary positioning side, to flow therealong and along the arm which is cutting a thread, to cool the insert and the workpiece, said plurality of holes being spaced along the length of said insert holder to distribute said cooling fluid along said thread cutting teeth.

5. The threading apparatus described in claim 3 wherein:
said insert holder has a holder axis and is elongated along said holder axis, said insert holder having a rear end for mounting on a milling machine spindle and an opposite free end, and said recess extends parallel to said holder axis to the extreme free end of said holder, to enable insertion of said insert into said free end, whereby to scrape away dust from said holder positioning sides as the insert is inserted into the holder.

6. The threading apparatus described in claim 1 wherein:
said obtuse angle is about 120°, whereby to enable accurate locating in two dimensions in the plane of said cross-section, while assuring that no secondary locating side contacts the workpiece during threading.

7. The threading apparatus described in claim 1 wherein:
each of said secondary locating sides is at least 50% larger than each of said secondary locating sides.

8. The threading apparatus described in claim 1 wherein:
said cross-section includes a mount portion with six sides lying on the sides of a largely hexagonal polygon, which has two opposite sides longer than the other sides, said two longer sides forming said primary locating sides.

9. A threading apparatus comprising:
a thread cutting insert having a mount portion with an axis and only two arms that project in opposite directions from said mount portion, each arm having an outer border and a pair of opposite sides extending largely radially away from said axis, said outer border having a plurality of thread cutting teeth spaced parallel to said axis to cut a plurality of thread turns at the same time;
said mount portion having six substantially flat locating surfaces, including two primary locating surfaces that extend parallel to each other and four secondary locating surfaces that each extends at least about 90° to one of said primary locating surfaces, with each secondary locating surface extending parallel to another locating surface;
an elongated insert holder having an axis of rotation, said holder having first and second positioning surfaces for respectively engaging a primary and secondary locating surface of said insert while one of said arms projects largely radially from said holder axis, said holder having a recess extending along said holder axis and one of said insert arms lies in said recess but out of contact with the walls of said recess.

10. A threading apparatus comprising:
a thread cutting insert having amount portion with an axis and a plurality of arms that each projects from said mount portion, each arm having an outer border and a pair of opposite sides extending largely radially away from said axis, said outer border having a plurality of thread cutting teeth spaced parallel to said axis to cut a plurality of thread turns at the same time;
said mount portion having a plurality of substantially flat locating surfaces, including a plurality of primary locating surfaces and a plurality of secondary locating surfaces that each extends at least about 90° to one of said primary locating surfaces;
an elongated insert holder having an axis of rotation, si holder having first and second positioning surfaces for respectively engaging a primary and secondary locating surface of said insert while one of said arms projects largely radially from said holder axis, said holder having a recess extending along said holder axis and one of said insert arms lies in said recess but out of contact with the walls of said recess;
each primary locating surface is at least 50% longer than each secondary locating surface, as seen in a cross-sectional view taken along said insert axis, and each primary locating surface extends substantially parallel to the direction by which each arm extends radially away from said insert axis.

11. A threading apparatus comprising:
an insert which has a cross-section forming a mount portion with a plurality of straight insert locating sides lying on the sides of an imaginary hexagon that has an axis, except that two opposite sides of said hexagon are longer than the other four shorter sides, said cross section having a radially outwardly extending arm at each of two corners of said imaginary hexagon, each arm extending from the imaginary intersection of a pair of said shorter sides of the hexagon, with each arm having an outer border and a pair of opposite sides that extend in a largely radially outward direction from the axis of said hexagon, and with each arm forming a cutting edge at the intersection of the outer border and each of the sides of the arm;
each of said cutting edges forming at least one thread-cutting tooth;
a tooth holder for holding said insert, said tool holder having walls forming, in cross-section, a pair of straight holder positioning sides that abut a pair of said insert locating sides, and said tool holder having a clamp that presses a pair of said insert locating sides firmly against said pair of said holder positioning sides, whereby to accurately locate said insert.

* * * * *